US008817789B2

(12) United States Patent
Suzuki (10) Patent No.: US 8,817,789 B2
(45) Date of Patent: Aug. 26, 2014

(54) COMMUNICATION APPARATUS, COMMUNICATION APPARATUS CONTROL METHOD, AND COMPUTER PROGRAM FOR CAUSING COMPUTER TO EXECUTE THE CONTROL METHOD

(75) Inventor: Motoharu Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 12/912,804

(22) Filed: Oct. 27, 2010

(65) Prior Publication Data

US 2011/0038359 A1    Feb. 17, 2011

Related U.S. Application Data

(63) Continuation of application No. 12/525,407, filed as application No. PCT/JP2008/058227 on Apr. 22, 2008, now Pat. No. 7,978,671.

(30) Foreign Application Priority Data

Apr. 25, 2007  (JP) .................................. 2007-115635

(51) Int. Cl.
*H04L 12/28* (2006.01)
*H04L 12/56* (2006.01)
(52) U.S. Cl.
USPC ........................................... 370/392; 370/401
(58) Field of Classification Search
USPC .................................................. 370/338, 392
See application file for complete search history.

(56) References Cited

U.S. PATENT DOCUMENTS

| 7,324,511 | B2 | 1/2008 | Nishihara |
| 7,460,524 | B2 | 12/2008 | Khan |
| 7,489,688 | B2* | 2/2009 | Giesberts et al. ............. 370/392 |
| 7,978,671 | B2 | 7/2011 | Suzuki |
| 7,990,995 | B2 | 8/2011 | Nishibayashi et al. |
| 8,027,331 | B2* | 9/2011 | Hsu et al. ...................... 370/351 |
| 2005/0025167 | A1 | 2/2005 | Ishibashi et al. |
| 2005/0135318 | A1 | 6/2005 | Walton et al. |
| 2005/0265302 | A1* | 12/2005 | Nishibayashi et al. ....... 370/349 |
| 2006/0109816 | A1 | 5/2006 | Imaeda |
| 2007/0070964 | A1* | 3/2007 | Jang .............................. 370/338 |
| 2007/0110197 | A1 | 5/2007 | Bagchi et al. |

(Continued)

FOREIGN PATENT DOCUMENTS

| CN | 1338837 A | 3/2002 |
| CN | 1643952 A | 7/2005 |

(Continued)

OTHER PUBLICATIONS

Sep. 12, 2008 International Search Report and Written Opinion in PCT/JP2008/058227.

(Continued)

*Primary Examiner* — Shaq Taha
(74) *Attorney, Agent, or Firm* — Fitzpatrick, Cella, Harper & Scinto (57) ABSTRACT

In 802.11n, the time during which the band is occupied is prolonged by the use of the frame aggregation method or in accordance with the type of communication frame, and this may influence communication of another apparatus. To solve this problem, a communication frame length (a communication frame to be used and the number of frames to be aggregated) is determined by taking account of priority information of a plurality of communication apparatuses.

13 Claims, 8 Drawing Sheets

(56) References Cited

U.S. PATENT DOCUMENTS

| | | |
|---|---|---|
| 2008/0056297 A1* | 3/2008 | Gaur et al. .................... 370/447 |
| 2008/0165713 A1 | 7/2008 | Nishibayashi et al. |
| 2008/0186913 A1* | 8/2008 | Ahn et al. ..................... 370/329 |
| 2008/0195858 A1* | 8/2008 | Nguyen ........................ 713/151 |
| 2009/0067326 A1 | 3/2009 | Perrot et al. |
| 2009/0073945 A1* | 3/2009 | Seok ............................. 370/338 |

FOREIGN PATENT DOCUMENTS

| | | |
|---|---|---|
| CN | 1703024 A | 11/2005 |
| EP | 1 811 748 A1 | 7/2007 |
| JP | 2002-057738 A | 2/2002 |
| JP | 2005-176367 A | 6/2005 |
| JP | 2005-311495 A | 11/2005 |
| JP | 2005-341441 A | 12/2005 |
| JP | 2006-173867 A | 6/2006 |
| JP | 2006-246539 A | 9/2006 |
| WO | 2005/067214 A1 | 7/2005 |

OTHER PUBLICATIONS

Jun. 23, 2011 Chinese Official Action in Chinese Patent Appln. No. 200880012419.1.

Jun. 5, 2012 Chinese Official Action in Chinese Patent Appln. No. 200880012419.1.

* cited by examiner

| STA | ACCESS CATEGORY | REQUESTED BAND |
|---|---|---|
| STA 1 | AC_BK | 2Mbps |
| STA 2 | AC_VO | 5Mbps |
| STA 3 | AC_BE | 24Mbps |
| STA 4 | AC_BE | 5Mbps |
| STA 5 | AC_VO | 2Mbps |
| STA 6 | AC_BE | 10Mbps |
| STA 7 | AC_BE | 8Mbps |
| STA 8 | AC_VI | 24Mbps |
| STA 9 | AC_BK | 3Mbps |

FIG. 5B

| PRIORITY ORDER | STA 1 | ACCESS CATEGORY | REQUESTED BAND |
|---|---|---|---|
| 1 | STA 2 | AC_VO | 5Mbps |
| 2 | STA 5 | AC_VO | 2Mbps |
| 3 | STA 8 | AC_VI | 24Mbps |
| 4 | STA 3 | AC_BE | 24Mbps |
| 5 | STA 6 | AC_BE | 10Mbps |
| 6 | STA 7 | AC_BE | 8Mbps |
| 7 | STA 4 | AC_BE | 5Mbps |
| 8 | STA 9 | AC_BK | 3Mbps |
| 9 | STA 1 | AC_BK | 2Mbps |

FIG. 6

COMMUNICATION APPARATUS, COMMUNICATION APPARATUS CONTROL METHOD, AND COMPUTER PROGRAM FOR CAUSING COMPUTER TO EXECUTE THE CONTROL METHOD

This application is a continuation of application Ser. No. 12/525,407 filed Jul. 31, 2009, which is the National Stage of International Patent Application No. PCT/JP2008/058227 filed Apr. 22, 2008.

TECHNICAL FIELD

The present invention relates to a communication apparatus, a communication apparatus control method, and a computer program for causing a computer to execute the control method.

BACKGROUND ART

The communication speeds of wireless LAN systems standardized as the IEEE802.11 (to be referred to as 802.11 hereinafter) standards have increased with the advent of 802.11b, 802.11g, and the like. Presently, 802.11n for 100 Mbps or more is being standardized.

802.11n has proposed a frame aggregation method as a technique that improves the throughput. Frame aggregation is a technique that reduces the overhead of a header or the like by transmitting a plurality of data by binding (multiplexing) them into one header.

This frame aggregation method allows 802.11n to transmit data by using a communication frame having a data length larger than those of systems such as 802.11a, 802.11b, and 802.11g.

Various techniques have been proposed in communication systems using the frame aggregation method.

In one technique, a plurality of MAC frames to be aggregated into a PHY frame are selectively aggregated in accordance with the attributes of the MAC frames (Japanese Patent Laid-Open No. 2006-246539).

In another technique, the data transmission period is divided into an active period and inactive period, and the sizes of packets to be aggregated in the active period and inactive period are made different from each other (Japanese Patent Laid-Open No. 2005-176367).

In still another technique, the size of packets to be aggregated is changed based on the fluctuations of a propagation path to be used in data transmission (Japanese Patent Laid-Open No. 2006-173867).

Also, 802.11n is scheduled to support the three types of PHY frame formats, that is, the Legacy mode, Mixed mode, and Greenfield mode.

The Legacy mode is a frame having the same structure as that of 802.11a and 802.11g. Even an apparatus (to be referred to as a Legacy apparatus hereinafter) that supports 802.11a and 802.11g but cannot support 802.11n can interpret this frame format including data.

The Mixed mode is a frame in which the preamble of 802.11n follows a preamble which apparatuses of 802.11a and 802.11g can interpret. This frame has compatibility with 802.11a and 802.11g.

The Greenfield mode is a frame which only an apparatus (to be referred to as an 11n apparatus hereinafter) corresponding to 802.11n can interpret.

Thus, 802.11n is expected to achieve backward compatibility with 802.11a and 802.11g.

802.11n is also scheduled to include the techniques of QoS (Quality of Service) introduced by 802.11e.

As described above, 802.11n can improve the throughput by using the frame aggregation method. On the other hand, the frame aggregation method may have influence on data transmission of peripheral apparatuses. That is, as the number of frames to be aggregated increases, the communication frame length increases, and this prolongs the time during which an 11n apparatus occupies the band. This probably decreases the throughput because the time during which peripheral apparatuses can transmit data shortens.

Furthermore, 802.11n changes the length of a preamble portion in accordance with the type of communication frame, so the band occupation time changes in accordance with the type of communication frame to be used. Accordingly, when a communication frame having a large preamble length is used, the band occupation time is prolonged. This presumably decreases the throughput of data transmission by peripheral apparatuses as in the case of frame aggregation.

This problem can be a serious problem when performing QoS control (priority control). For example, if an 11n apparatus starts forwarding data by using frame aggregation while a Legacy apparatus is performing video data transmission (having a high priority) by QoS control of 802.11e, the communication quality of the Legacy apparatus probably deteriorates.

DISCLOSURE OF INVENTION

The present invention realizes to solve the problem when determining a communication frame length.

According to the present invention, the foregoing problem is solved by providing a communication apparatus comprising: a discriminating unit configured to discriminate priority information concerning data communication of another communication apparatus; and a defining unit configured to define a communication frame length on the basis of the discriminated priority information.

Further features of the present invention will be apparent from the following description of exemplary embodiments with reference to the attached drawings.

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

In the following explanation, a wireless communication apparatus corresponding to 802.11n as a first wireless communication method will be called an 11n apparatus. Also, a wireless communication apparatus not corresponding to 802.11n as the first wireless communication method but corresponding to 802.11a and 802.11g will be called a Legacy apparatus.

Figure 1:
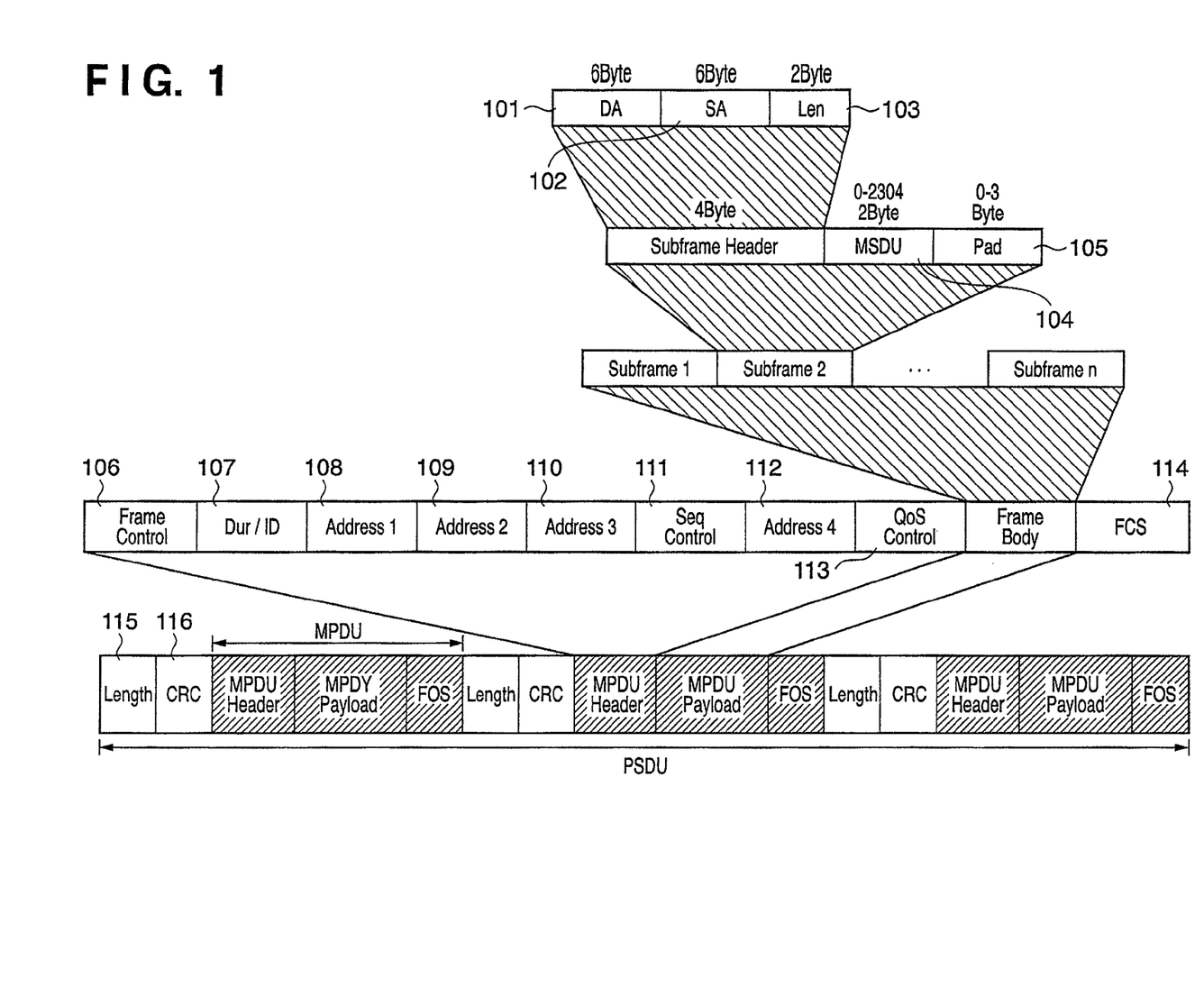
FIG. 1 shows frame aggregation of IEEE802.11n.

An 11n apparatus can use the frame aggregation method described above. As this aggregation method, MSDU (MAC Service Data Unit) aggregation and MPDU (MAC Protocol Data Unit) aggregation have been proposed (FIG. 1).

MSDU aggregation is a method of generating an MPDU (MAC frame) having a large payload length by aggregating (multiplexing) a plurality of subframes including an MSDU, and giving one MAC header to the aggregate.

MPDU aggregation is a method of multiplexing a plurality of MPDUs (MAC frames) before forwarding them to a PSDU (PLCP Service Data Unit) of a PHY layer. A PPDU (PLCP Protocol Data Unit: a PHY frame) is then generated by giving one PHY header to the PSDU in which the MPDUs are multiplexed.

An 11n apparatus can determine (select) a communication frame to be used from the three types of PHY frame formats (FIG. 2) described above.

Figure 2:
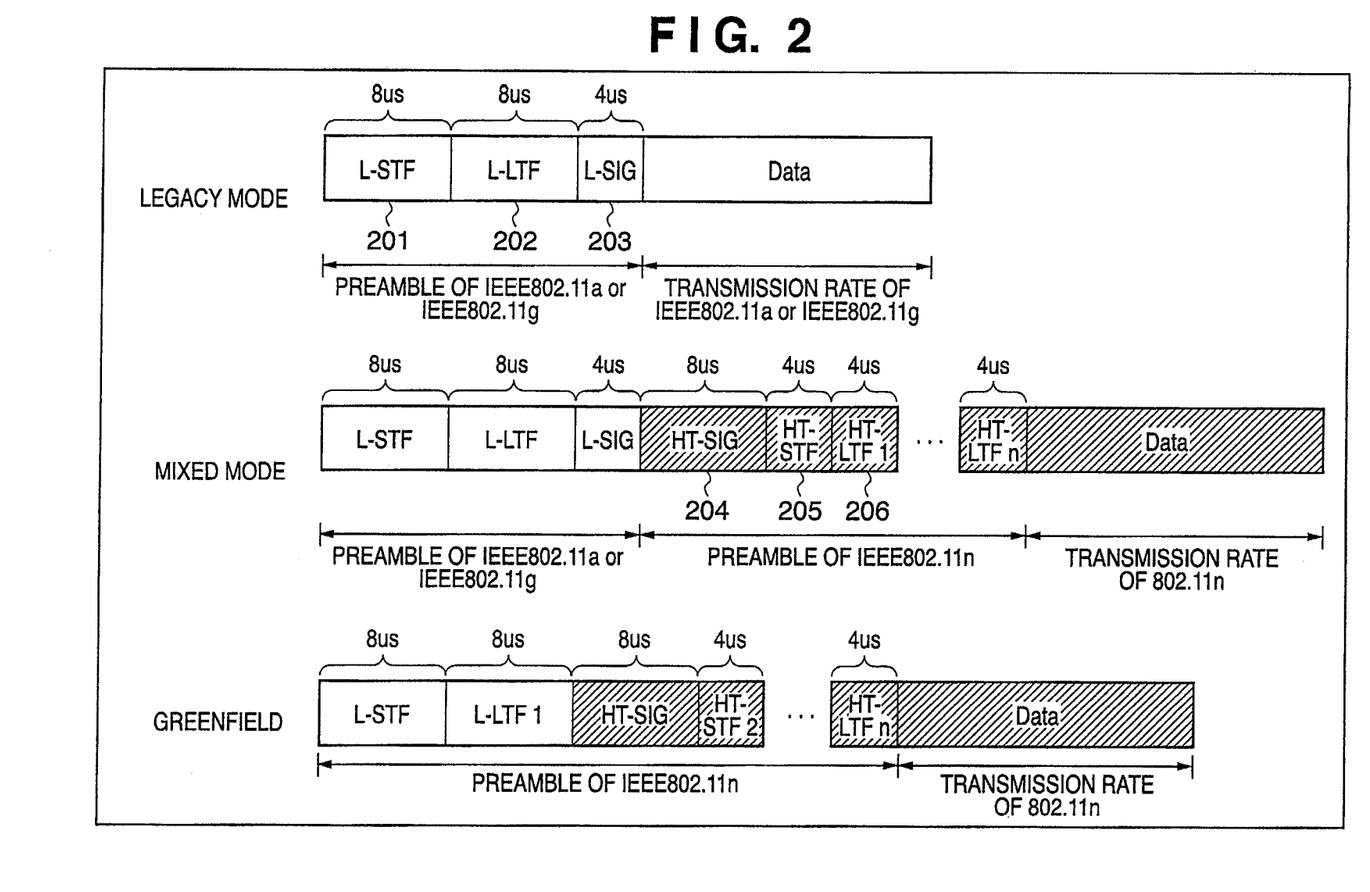
FIG. 2 shows the frame formats of IEEE802.11n.

The Legacy mode is a frame having the same structure as that of 802.11a and 802.11g. Even an apparatus corresponding to 802.11a and 802.11g but not corresponding to 802.11n can interpret this frame format including data.

The Mixed mode is a frame in which the preamble of 802.11n follows a preamble which an apparatus corresponding to 802.11a and 802.11g can interpret. This frame has compatibility with 802.11a and 802.11g.

The Greenfield mode is a frame which only an apparatus corresponding to 802.11n can interpret and an apparatus not corresponding to 802.11n cannot interpret.

Note that maximum data transmission rates (theoretical values) of these modes are 54 Mbps (the Legacy mode), 100 Mbps (the Mixed mode), and 100 Mbps or more (the Greenfield mode).

Performing communication by using a communication frame of the Mixed mode or Greenfield mode will be called "a high-speed mode" hereinafter. That is, switching communication frames from the Legacy mode to the Mixed mode or Greenfield mode is equivalent to switching communication modes from the Legacy mode to the high-speed mode. Note that "a mode" mentioned in this embodiment means any of the three types of communication frames described above in some cases, and means communication using any of the three types of communication frames in some cases.

First Embodiment

Figure 3:
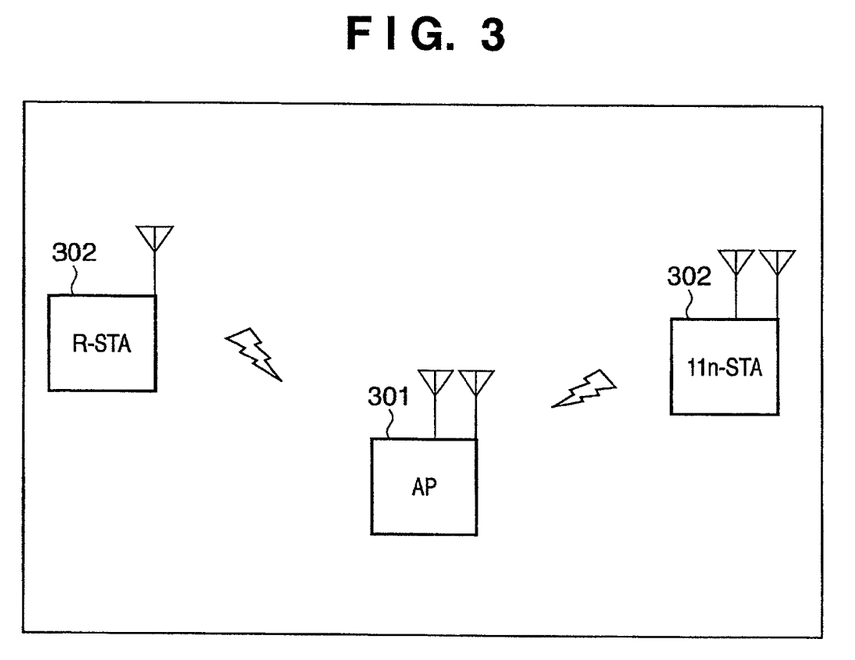
FIG. 3 shows an example of the basic configuration of a wireless communication system according to the first embodiment.

FIG. 3 is a view showing an example of the basic configuration of a wireless communication system according to the first embodiment. This wireless communication system comprises a base station (to be referred to as an AP (Access Point) hereinafter) and wireless terminals (to be referred to as STAs (STAtions) hereinafter). Although FIG. 3 shows the case where two STAs (302 and 303) exist for descriptive simplicity, three or more STAs can also exist.

An AP is a controller for controlling communication of STAs, and manages STAs existing in its own wireless service area. An AP can relay wireless communication between STAs, and directly communicate with STAs.

An STA is an apparatus that performs wireless communication with another STA under the control of an AP.

An AP 301 is an 11n apparatus and can perform communication in both the Legacy mode and high-speed mode.

An STA 302 is a Legacy apparatus (to be referred to as an R-STA hereinafter). The STA 302 can perform communication in the Legacy mode but cannot perform communication in the high-speed mode. On the other hand, an STA 303 is an 11n apparatus (to be referred to as an 11n-STA hereinafter), and can perform communication in both the Legacy mode and high-speed mode.

The AP 301, STA 302, and STA 303 have a QoS control (priority control) function defined by 802.11e, and can perform wireless communication by EDCA (Enhanced Distributed Channel Access).

EDCA implements priority control by classifying frames to be transmitted into four types of access categories (types of communication data; to be referred to as ACs hereinafter), and producing differences in service quality between these categories. Defined ACs are AC_BK for background traffic, AC_BE for best effort, AC_VI for video transmission, and AC_VO for voices. In each AC, a parameter to be used in access control is set in accordance with the priority of the AC. By executing a CSMA/CA (Carrier Sense Multiple Access with Collision Avoidance) procedure in accordance with the parameter, many transmission opportunities can be given to data of an AC having a higher priority.

The AP 301, STA 302, and STA 303 also have resources such as a calculating function and data holding function necessary to execute programs, and have a control function of controlling the apparatus itself, and a communicating function of communicating with another apparatus.

Figure 4:
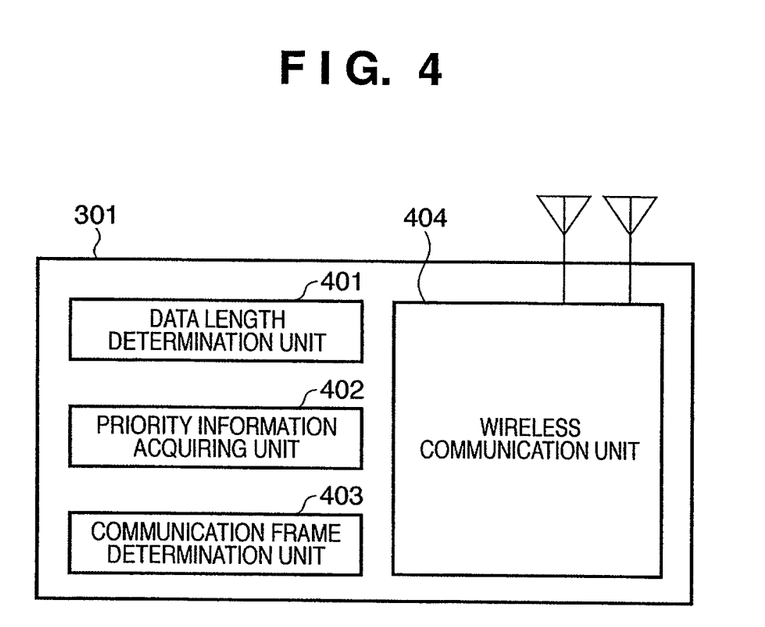
FIG. 4 is a block diagram of an AP 301.

FIG. 4 is a view showing the block configuration of the AP 301.

The AP 301 comprises a data length determination unit 401, priority information acquiring unit 402, communication frame determination unit 403, and wireless communication unit 404.

The data length determination unit 401 has a function of determining a data length (the length of a data portion following a PHY header portion) to be stored in a communication frame for use in wireless communication. More specifically, the data length determination unit 401 determines the length of the MSDU and the number of frames (subframes including the MSDU and MAC frames) to be aggregated. Note that the length of the MSDU is fixed in the following explanation for descriptive simplicity. Accordingly, the data length is determined by determining the number of frames to be aggregated.

The priority information acquiring unit 402 acquires and discriminates priority information concerning STAs existing on the same network as that of the AP 301.

Figure 5A:
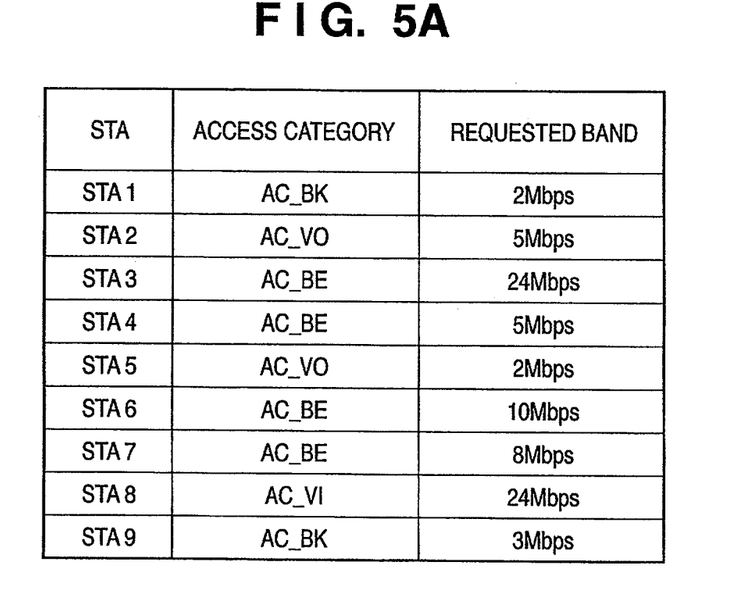
FIGS. 5A and 5B illustrate examples of priority information in the first embodiment.

FIG. 5A shows an example of the priority information. Referring to FIG. 5A, the AC of a frame which each STA connected to the AP 301 transmits and a band requested by the STA are described.

Figure 5B:
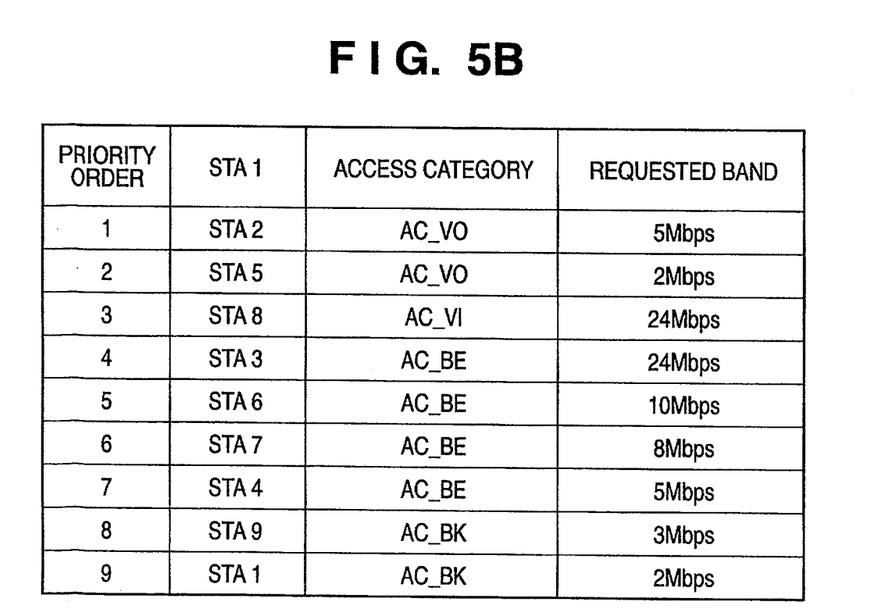

The priority information acquiring unit 402 also has a function of determining the priority of each STA based on the acquired priority information. FIG. 5B shows an example in which the STAs are rearranged in priority order based on the priority information shown in FIG. 5A. In this example, the STAs are sorted in descending order of the AC priority (AC_VO>AC_VI>AC_BE>AC_BK), and then sorted in descending order of the requested band.

The communication frame determination unit 403 has a function of determining (selecting) a communication frame to be used in wireless communication. More specifically, the communication frame determination unit 403 determines (selects) a communication frame to be used from communication frames of the Legacy mode, Mixed mode, and Greenfield mode. The communication frame determination unit 403 can also switch (change) communication frames to be used.

Note that the data length determined by the data length determination unit 401 and the type of communication frame determined by the communication frame determination unit 403 determine the length of the communication frame. Although the data length determination unit 401 and communication frame determination unit 403 are formed as different blocks in FIG. 4, the data length determination unit 401 and communication frame determination unit 403 may also be combined into one block (communication frame length determination unit).

The wireless communication unit 404 performs data transmission with an STA in accordance with the communication frame determined by the communication frame determination unit 403, and the data length determined by the data length determination unit 401.

Figure 6:
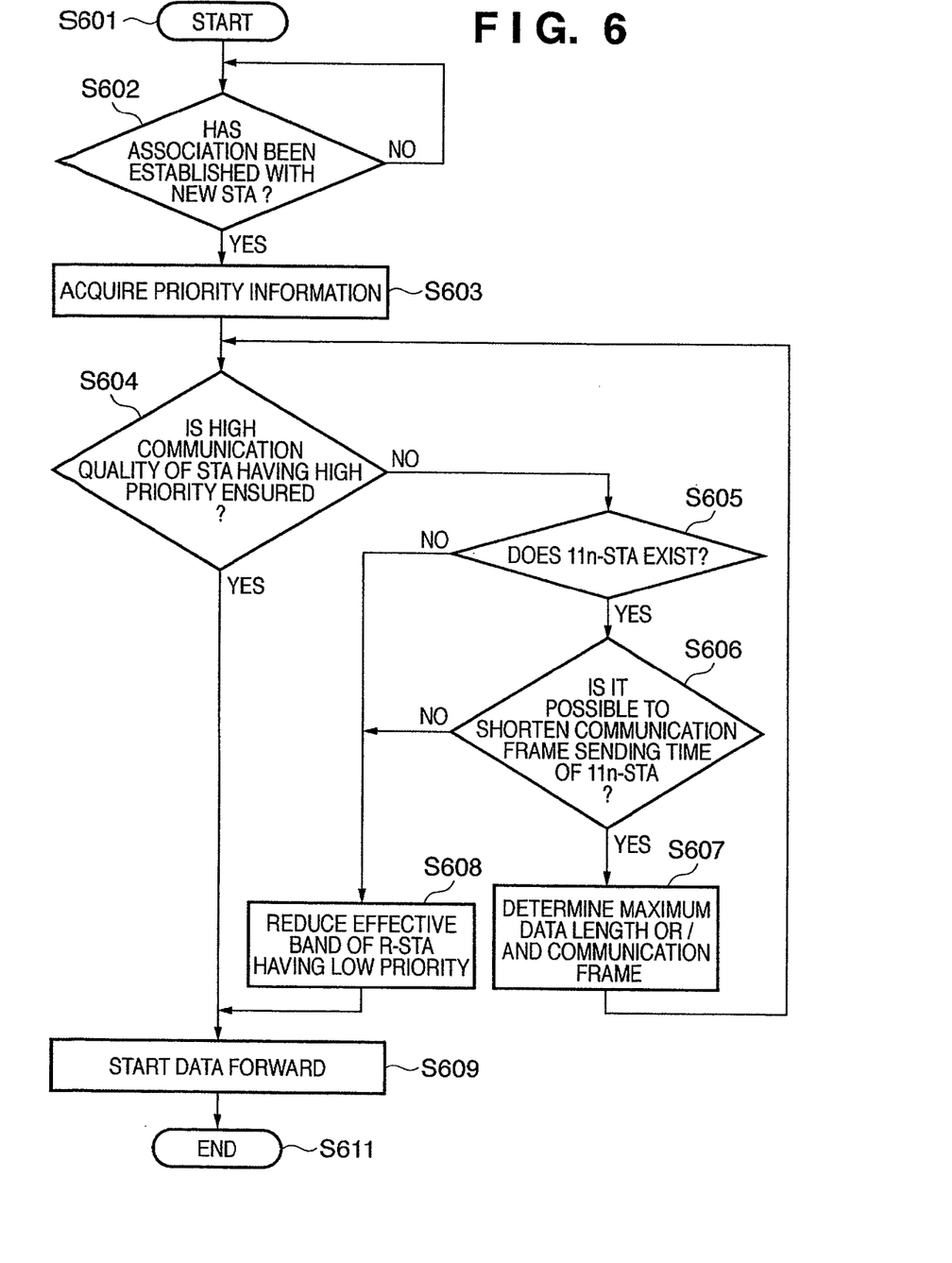
FIG. 6 is a flowchart of the operation of the AP 301.

FIG. 6 is a flowchart showing the operation of the AP 301 according to this embodiment.

In S601, the AP 301 has established association (a logical connection) with one or more STAs. A case where a new STA associates will be explained below.

If it is determined in S602 that the AP 301 has established association with the new STA (Yes in S602), the priority information acquiring unit 402 acquires the priority information of the STA (S603). Note that the priority information can be acquired by exchanging specific messages after association, or can also be contained in messages to be exchanged when performing association.

Assume that the priority information contains the AC and requested band as described above. If the STA has not designated any requested band, the AP 301 can set any arbitrary value. The AP 301 can also change the set value at any arbitrary timing. In S603, the AP 301 checks the acquired priority information, and determines whether a high quality of communication with an STA having a high priority can be ensured even when the new STA starts data transmission.

Various methods can be used as criteria for determining whether a high communication quality is assured. An example is a method of determining, as the determination criterion, whether a band exceeding the band requested by the STA can be secured. This embodiment will be explained by using this example.

Another example is a method that uses the actual values of the bands of wireless communication performed so far, and determines, as the determination criterion, whether a band exceeding the actual values can be secured. Still another example is a method of determining, as the determination criterion, whether it is possible to secure a band over which a maximum delay time when sending each communication frame does not exceed a predetermined value in wireless communication requiring real time properties. These methods are particularly effective when it is necessary to ensure a high communication quality when performing stream transmission of, for example, voices and images for which the amount of information per unit time is predetermined.

As shown in FIG. 3, if two apparatuses have established association with the AP, whether a high communication quality of an STA having a higher priority is assured is determined. If the number of STAs having established association with the AP is three or more, various methods can be used as determination criteria. For example, it is possible to determine in advance the number (m) of STAs for which a high communication quality is ensured, and ensure a high communication quality of the first to mth STAs in priority order. It is also possible to assure a high communication quality of an apparatus (e.g., an apparatus whose AC is AC_VO or AC_VI) whose priority information satisfies a predetermined criterion. The number of STAs for which a high communication quality is ensured may also be determined in advance for each AC.

If the AP 301 determines that a high communication quality of the STA having a high priority is ensured (Yes in S604), the AP 301 starts forwarding data to the new STA (S609). If the new STA is an 11n-STA, the AP 301 determines a communication frame and data length to be used, and notifies the 11n-STA of the determined contents. If the AP 301 determines that a high communication quality of the STA having a high priority is not assured (No in S604), the process advances to step S605.

In S605, the AP 301 determines whether an 11n-STA exists among the STAs (including the new STA) having established association with the AP 301 (S605).

If an 11n-STA exists (Yes in S605), the AP 301 determines whether a time (to be referred to as a communication frame sending time hereinafter) required to send a communication frame in data transmission with the 11n-STA can be shortened (S606). Since the time during which the 11n-STA occupies the band can be shortened by shortening this communication frame sending time, the data forward time of another STA can be prolonged. A method of shortening the communication frame sending time will be explained below.

The communication frame sending time can be calculated by the following equation.

Communication frame sending time=communication frame length÷communication frame transmission rate That is, the larger the data length determined by the data length determination unit 401, the longer the communication frame sending time. In other words, the larger the number of frames to be aggregated, the longer the communication frame sending time.

Also, the frames determined by the communication frame determination unit 403 are different in length of the preamble portion (Legacy mode<Greenfield mode<Mixed mode). Accordingly, the communication frame lengths are different for the same data length. For the same transmission rate, therefore, the communication frame sending time when wireless communication is performed in the Greenfield mode is longer than that when wireless communication is performed in the Legacy mode. Similarly, for the same transmission rate, the communication frame sending time when wireless communication is performed in the Mixed mode is longer than that when wireless communication is performed in the Greenfield mode.

Accordingly, when a communication frame is the high-speed mode and communication is performed by a large data length by frame aggregation, for example, the communication frame sending time can be shortened by decreasing the data length (decreasing the number of frames to be aggregated).

If the transmission rate and data length are equivalent to those of the Legacy mode although a communication frame of the high-speed mode is used, the communication frame sending time can be shortened by switching communication frames from the high-speed mode to the Legacy mode.

In S606, if the AP 301 determines that a high communication quality of the STA having a high priority can be assured by shortening the communication frame sending time in data transmission with the 11n-STA (Yes in S606), the process advances to S607.

In S607, the AP 301 determines a data length or/and communication frame for shortening the communication frame sending time in data transmission with the 11n-STA (S607). For example, if the 11n-STA has associated with the AP 301 while the R-STA has already started data transmission, the AP 301 determines to use the Legacy mode or Mixed mode as a communication frame so that the R-STA and 11n-STA can coexist. When determining a communication frame to be used, the AP 301 determines in accordance with the AC and requested band of data to be transmitted by the 11n-STA whether it is necessary to use frame aggregation. Also, if all STAs having associated with the AP 301 are 11n-STAs, the AP 301 determines to use the Greenfield mode as a communication frame, and determines the number of frames to be aggregated.

When determining the data length, a maximum data length need only be set within the range over which the band of the STA having a high priority can be secured and within the range of the requested band. This makes it possible to ensure a high communication quality of the STA having a high priority and improve the throughput of the 11n-STA at the same time.

If No in S605 or S606, the AP 301 makes the band to be secured to perform data transmission with the R-STA having a low priority narrower than the requested band (S608), and starts data transmission with the STA (S609). When narrowing the band, a maximum band need only be set within the range over which a high communication quality of the STA having a high priority is assured. This makes it possible to minimize the decrease in throughput of the R-STA having a low priority.

This procedure makes it possible to determine an STA for which a high communication quality is assured based on the priority information of a plurality of STAs, and determine a communication frame length to be used in communication between 11n apparatuses in accordance with the determination result. For example, a high communication quality of an STA having a high priority can be ensured by changing the communication frame of an 11n-STA having a low priority to the Legacy mode, or decreasing the number of frames to be aggregated.

Representative sequences based on the operation procedure shown in FIG. 6 will be explained below with reference to FIGS. 7 and 8.

Figure 7:
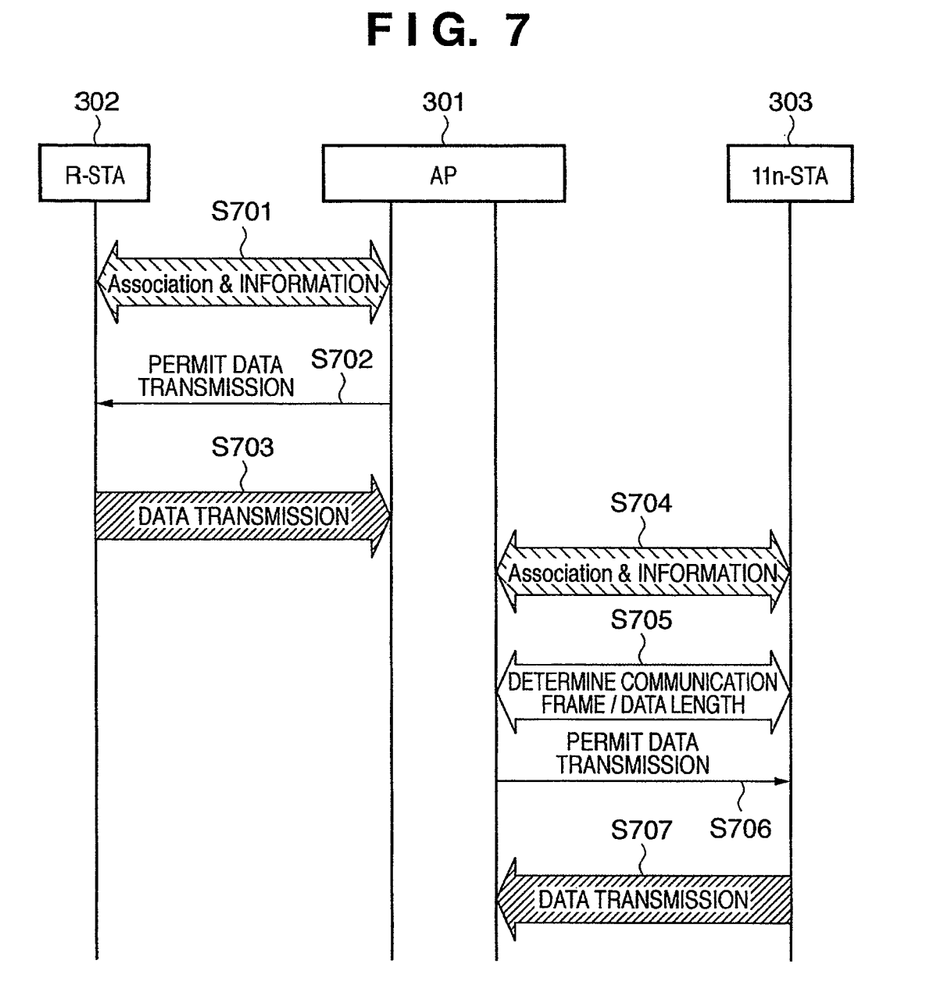
FIG. 7 is a sequence diagram of the first embodiment.

FIG. 7 is a view showing a sequence when the 11n-STA 303 performs data transmission with the AP 301 after the R-STA 302 has started data transmission with the AP 301. Assume that the priority of the R-STA 302 is higher than that of the 11n-STA 303.

Details of FIG. 7 will be explained. In S701, the AP 301 establishes association with the R-STA 302. In this step, the AP 301 acquires the priority information (AC and request band) from the R-STA 302.

In S702, the AP 301 transmits a data transmission permission message to the R-STA 302.

In S703, the R-STA 302 having received the data transmission permission message from the AP 301 starts data transmission.

In S704, association is established between the AP 301 and 11n-STA 303 (Yes in S602). In this step, the AP 301 acquires the priority information (AC and requested band) from the 11-STA 303 (S603).

Based on the acquired priority information, the AP 301 determines whether a high communication quality of the R-STA 302 having a high priority is assured (S604). Assume that the AP 301 determines that a high communication quality of the R-STA 302 cannot be assured because the band requested by the R-STA 302 cannot be secured (No in S604).

In S705, the AP 301 determines a communication frame and a data length in the communication frame to be used between the AP 301 and 11n-STA 303 (Yes in S605, Yes in S606, and S607), and notifies the 11n-STA 303 of the determined contents. Note that the AP 301 determines the communication frame and data length such that a maximum band can be secured for the 11n-STA 303 within the range over which a high communication quality of the R-STA 302 is ensured. In this case, AP 301 determines to use the Legacy mode or Mixed mode as a communication frame so that the R-STA 302 and 11n-STA 303 can coexist. If it is necessary to make the data transmission rate of the 11n-STA less than 54 Mbps in order to ensure a high communication quality of the R-STA 302, the AP 301 determines to use the Legacy mode having a short preamble portion as a communication frame. If the AP 301 determines that a high communication quality of the R-STA 302 is assured even when frame aggregation is performed, the AP 301 determines to use the Mixed mode as a communication frame.

In S706, the AP 301 transmits a data transmission permission message to the 11n-STA 303.

In S707, the 11n-STA 303 having received the data transmission permission message from the AP 301 starts data transmission (S609).

Even when the 11n-STA starts data transmission while the R-STA having a high priority has already started data transmission with the AP as in this sequence, the 11n-STA can perform data transmission while a high communication quality of the R-STA is assured.

Figure 8:
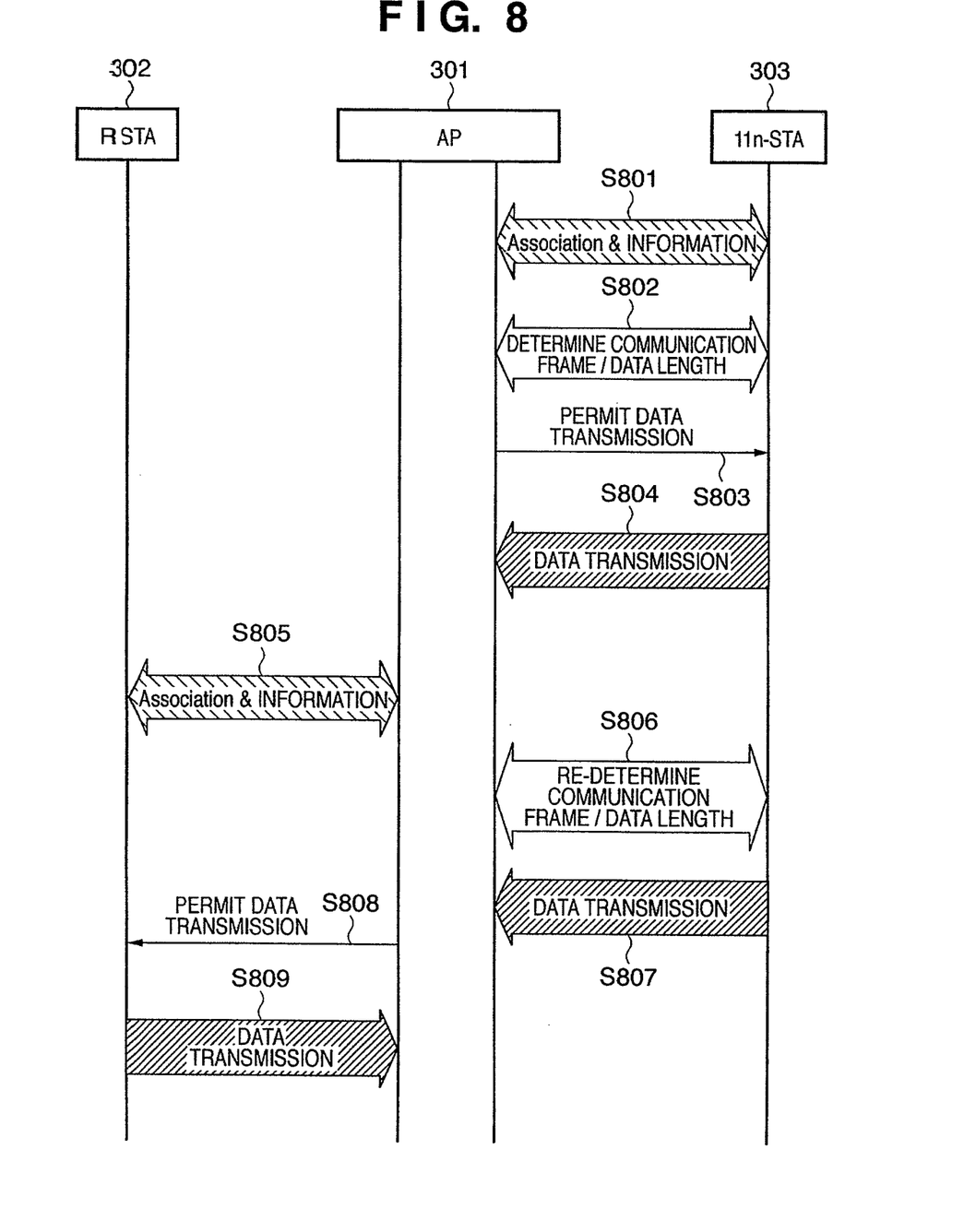
FIG. 8 is a sequence diagram of the first embodiment.

FIG. 8 shows a sequence when the R-STA 302 performs data transmission with the AP 301 after the 11n-STA 303 has started data transmission with the AP 301. Assume that the priority of the R-STA 302 is higher than that of the 11n-STA 303 in this case as well.

Details of FIG. 8 will be explained. In S801, the AP 301 establishes association with the 11n-STA 303. In this step, the AP 301 acquires the priority information (AC and requested band) from the 11n-STA 303.

In S802, the AP 301 determines a communication frame and data length to be used between the AP 301 and 11n-STA 303. Since the AP 301 is not connected to any other STA, the AP 301 determines to use the Greenfield mode as a communication frame, and starts data transmission by using a maximum data length within the range over which the requested band can be secured.

In S803, the AP 301 transmits data transmission permission message to the 11n-STA 303.

In S804, the 11n-STA 303 having received the data transmission permission message from the AP 301 starts data transmission.

In S805, association is established between the AP 301 and R-STA 302 (Yes in S602). In this step, the AP 301 acquires the priority information (AC and requested band) from the R-STA 302 (S603).

Based on the acquired priority information, the AP 301 determines whether a high communication quality of the R-STA 302 having a high priority is ensured (S604). Assume that the AP 301 determines that a high communication quality of the R-STA 302 is not assured because the band requested by the R-STA 302 cannot be secured (No in S604).

In S806, the AP 301 re-determines a communication frame and a data length in the communication frame to be used between the AP 301 and 11n-STA 303 having already started data transmission (Yes in S605, Yes in S606, and S607), and notifies the 11n-STA 303 of the re-determined contents. Note that the AP 301 determines the communication frame and data length such that a maximum band can be secured for the 11n-STA 303 within the range over which a high communication quality of the R-STA 302 is ensured. In this case, the AP 301 changes the communication frame from the Greenfield mode to the Legacy mode or Mixed mode so that the R-STA 302 and 11n-STA 303 can coexist. If it is necessary to make the data transmission rate of the 11n-STA less than 54 Mbps in order to assure a high communication quality of the R-STA 302, the AP 301 determines to use the Legacy mode having a short preamble portion as a communication frame. If the AP 301 determines that a high communication quality of the R-STA 302 is assured even when frame aggregation is performed, the AP 301 determines to use the Mixed mode as a communication frame.

In S807, the 11n-STA 303 resumes data transmission with the AP 301 by using the re-determined communication frame and data length.

In S808, the AP 301 transmits a data transmission permission message to the R-STA 302.

In S809, the R-STA 302 having received the data transmission permission message from the AP 301 starts data transmission (S609).

When the R-STA having a high priority starts data transmission while the 11n-STA is performing data transmission with the AP as in this sequence, the communication frame length of the 11n-STA can be changed in order to ensure a high communication quality of the R-STA.

Although the case where the R-STA and 11n-STA coexist under the same AP has been explained with reference to FIGS. 7 and 8, analogous control can be performed even when a plurality of 11n-STAs alone exist under the same AP.

In this embodiment as described above, when a new STA has established association with an AP, the AP can determine a communication frame length to be used between 11n apparatuses so as to assure a high communication quality of an STA having a high priority. Even when an 11n apparatus exists, therefore, appropriate QoS control can be performed across the network as a whole.

Second Embodiment

In the above embodiment, when a new STA has associated with an AP, the AP determines a communication frame and data length to be used in wireless communication with an 11n apparatus. However, it is also possible to re-determine the communication frame or/and data length when the STA has disassociated.

For example, if an STA having a high priority has disassociated while an 11n-STA having a low priority is performing communication in the Legacy mode, the throughput of the 11n-STA can be improved by switching the transmission mode of the 11n-STA to the high-speed mode.

Also, if an STA having a high priority has disassociated while an 11n-STA having a low priority is forwarding data without any aggregation, the 11n-STA can improve the throughput by performing aggregation.

As described above, this embodiment can switch to an appropriate communication frame length corresponding to QoS in accordance with the fluctuation of an STA forming the network, even after data forward has started.

Third Embodiment

Although the AC and requested band are used as the priority information in the above embodiments, another information can also be used as the priority information. For example, information indicating the necessity of real-time transmission may also be included in the priority information. In this case, it is possible to use the host protocol (e.g., RTP) for use in communication as the priority information, or allow the user to designate whether real-time transmission is necessary by using the host application. The type of apparatus (e.g., a display or DVD recorder) may also be used as the priority information. Furthermore, the priority corresponding to the type of host application of wireless transmission may also be used. In this case, the priority corresponding to the network address and port number need only be prepared as a table. By using these pieces of information as the priority information, more precise priority control can be performed in addition to QoS control of 802.11e. For example, if the priority order cannot be determined by the AC and requested band alone, the priority order can be determined by checking the priority information of the host protocol.

The order of the establishment of association with an AP may also be used as the priority information. For example, if a plurality of STAs having the same AC and requested band exist, an STA having established association earlier is given a higher priority. This makes it possible to ensure a high communication quality of an STA having established association with an AP earlier when a plurality of STAs having equal priority information exist.

Fourth Embodiment

In each of the above embodiments, an AP acquires the priority information from an STA, and determines the communication frame and/or data length of an 11n-STA based on the acquired priority information. However, an STA may also determine the communication frame and/or data length. In a case like this, an AP notifies an STA of the priority information, and the STA determines the communication frame and/or data length based on the notified priority information.

Fifth Embodiment

The object of the present invention can of course be achieved by supplying a recording medium recording the program code of software for implementing the functions of the embodiments described above to a system or apparatus, and allowing a computer (CPU or MPU) of the system or apparatus to read out and execute the program code stored in the recording medium.

In this case, the program code itself read out from the recording medium implements the functions of the above embodiments, and the recording medium storing the program code constitutes the present invention.

As the recording medium for supplying the program code, it is possible to use, for example, a floppy (registered trademark) disk, hard disk, optical disk, magnetooptical disk, CD-ROM, CD-R, magnetic tape, nonvolatile memory card, or ROM.

Also, besides the functions of the above embodiments are implemented by executing the readout program code by the computer, the present invention naturally includes the case where the OS (Operating System) running on the computer executes part or the whole of actual processing based on instructions by the program code, thereby implementing the functions of the above embodiments.

Furthermore, the present invention of course includes the case where the program code read out from the recording medium is written in a memory of a function expansion board inserted into the computer or in a memory of a function expansion unit connected to the computer, and a CPU or the like of the function expansion board or function expansion unit executes part or the whole of actual processing based on instructions by the program code, thereby implementing the functions of the above embodiments.

In each embodiment as described above, it is possible to determine the communication frame length of frame aggregation (determine a data length and a communication frame to be used) based on the priority information of a plurality of communication apparatuses. Accordingly, adequate QoS control can be performed across the network as a whole even in an environment in which an 11n apparatus exists. It is also possible to efficiently use the features of 802.11n, that is, the improvement in throughput by frame aggregation, and the realization of downward compatibility by the support for a plurality of communication frames.

In the explanation as described above, the priority information concerning data communication of another communication apparatus is discriminated, and a communication frame length is determined based on the discriminated priority information. In this manner, the communication frame length can be determined by taking account of the priority information of another communication apparatus.

Also, the communication frame length is determined by the number of frames to be aggregated. This makes it possible to determine an appropriate number of frames to be aggregated by taking account of the priority information of another communication apparatus.

The communication frame length is determined by selecting a communication frame to be used. In this way, an adequate communication frame can be determined by taking account of the priority information of another communication apparatus.

The communication frame length is determined by the number of frames to be aggregated and the type of communication frame to be used. This makes it possible to determine an appropriate number of frames to be aggregated and an adequate communication frame by taking account of the priority information of another communication apparatus.

Furthermore, a communication apparatus for which a high communication quality is assured is determined based on the discriminated priority information, and the communication frame length is determined based on the determination result. Accordingly, an appropriate communication frame length can be determined based on whether a high communication quality of a communication apparatus having a high priority can be assured.

If a communication apparatus corresponding to a first communication method exists among communication apparatuses except for a communication apparatus for which it is determined that a high communication quality is ensured, a communication frame length to be used by the first communication apparatus is shortened. This makes it possible to ensure a high communication quality of a communication apparatus having a high priority.

If no communication apparatus corresponding to the first communication method exists among communication apparatuses except for a communication apparatus for which it is determined that a high communication quality is assured, a band to be used by a communication apparatus not corresponding to the first communication method is narrowed. Also, if a communication frame length to be used by a communication apparatus corresponding to the first communication method is not to be changed, a band to be used by a communication apparatus not corresponding to the first communication method is narrowed. In this manner, a high communication quality of a communication apparatus having a high priority can be ensured even if there is no communication apparatus having a changeable communication frame length and corresponding to the first communication method, or if the communication frame length of the communication apparatus is not to be changed.

The priority information contains the type of communication data or a band requested by a communication apparatus. Therefore, the communication frame length can be determined based on the type of communication data of another communication apparatus, or the band requested by another apparatus.

The present invention can determine a communication frame length by taking account of the priority information of another communication apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-115635 filed Apr. 25, 2007, which is hereby incorporated by reference herein in its entirety.

The invention claimed is:

1. A communication apparatus comprising a processor configured to function as units including:
   (1) a discriminating unit configured to discriminate (a) first priority information concerning data communication of a first communication apparatus which has newly joined a network and (b) second priority information concerning data communication of a second communication apparatus which has already joined a network; and
   (2) a defining unit configured to define a type of a communication frame or a communication frame length used for the data communication of the first communication apparatus, in accordance with the first priority information and the second priority information,
   wherein the processor is further configured to function as a determining unit configured to determine a communication apparatus for which a high communication quality is assured, on the basis of the second priority information discriminated by said discriminating unit, and
   wherein said defining unit defines at least one of the type of the communication frame and a number of frames to be aggregated in the communication frame on the basis of the result of the determination by said determining unit.

2. The apparatus according to claim 1, wherein the type of the communication frame is selected from a plurality of communication frame types.

3. The apparatus according to claim 1, wherein the first priority information comprises one of a type of communication data and a band requested by the first communication apparatus.

4. A communication apparatus control method comprising:
   discriminating (a) first priority information concerning data communication of a first communication apparatus which has newly joined a network and (b) second priority information concerning data communication of a second communication apparatus which has already joined a network;
   determining a type of a communication frame or a communication frame length used for the data communication of the first communication apparatus, in accordance with the first priority information and the second priority information; and
   determining a communication apparatus for which a high communication quality is assured, on the basis of the second priority information discriminated in said discriminating step, wherein at least one of the type of the communication frame and a number of frames to be aggregated in the communication frame is defined on the basis of the result of the determination in the determining step.

5. A non-transitory computer-readable storage medium storing a computer program for causing a computer to execute a control method as recited in claim 4.

6. The apparatus according to claim 1, wherein said determining unit is further configured to determine the communication apparatus for which the high communication quality is assured, on the basis of the first priority information and the second priority information discriminated by said discriminating unit.

7. The apparatus according to claim 1, wherein said defining unit defines the type of the communication frame in accordance with the first priority information and the second priority information.

8. The apparatus according to claim 1, wherein each of the first priority information and the second priority information includes one of AC_BK, AC_BE, AC_VI, and AC_VO.

9. The apparatus according to claim 1, wherein said defining unit defines, in accordance with the first priority information and the second priority information, the type of the communication frame to be one of (1) a frame having the same structure as that of 802.11a and 802.11g, (2) a frame in which the preamble of 802.11n follows a preamble which an apparatus corresponding to 802.11a and 802.11g can interpret, and (3) a frame which only an apparatus corresponding to 802.11n can interpret and an apparatus not corresponding to 802.11n cannot interpret.

10. An apparatus comprising:
discriminating means for discriminating (a) first priority information concerning data communication of a first communication apparatus which has newly joined a network and (b) second priority information concerning data communication of a second communication apparatus which has already joined a network;
one of (1) defining means for defining a type of a communication frame used for the data communication of the first communication apparatus, in accordance with the first priority information and the second priority information, and (2) defining means for defining a communication frame length used for the data communication of the first communication apparatus, in accordance with the first priority information and the second priority information; and
determining means for determining a communication apparatus for which a high communication quality is assured, on the basis of the second priority information discriminated by said discriminating means,
wherein at least one of the type of the communication frame and a number of frames to be aggregated in the communication frame is defined on the basis of the result of the determination by said determining means.

11. The apparatus according to claim 1, wherein said defining unit defines the communication frame length in accordance with the first priority information and the second priority information, and
wherein said defining unit defines the communication frame length in accordance with the first priority information and the second priority information by selecting from among three different length frame preamble portions.

12. The apparatus according to claim 1, wherein in response to the first communication apparatus disassociating from a network, said defining unit re-defines the type of the communication frame and the communication frame length.

13. The apparatus according to claim 1, wherein the first priority information and the second priority information are discriminated based on the order of (a) association of the first communication apparatus with a network and (b) association of the second communication apparatus with a network, respectively, such that an apparatus associating with a network earlier is given a higher priority.

* * * * *